May 27, 1924.
W. H. BUTTRAM
TIRE TOOL
Filed April 6, 1922
1,495,159
2 Sheets-Sheet 1
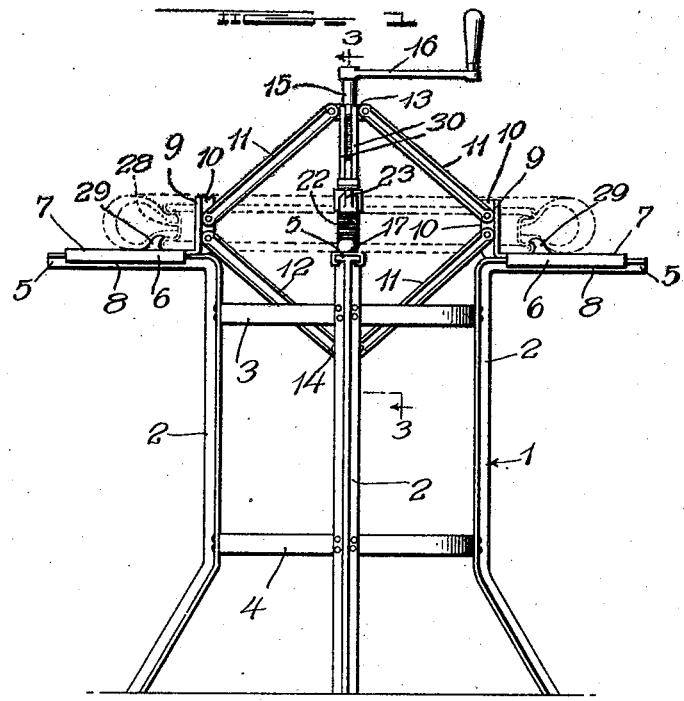
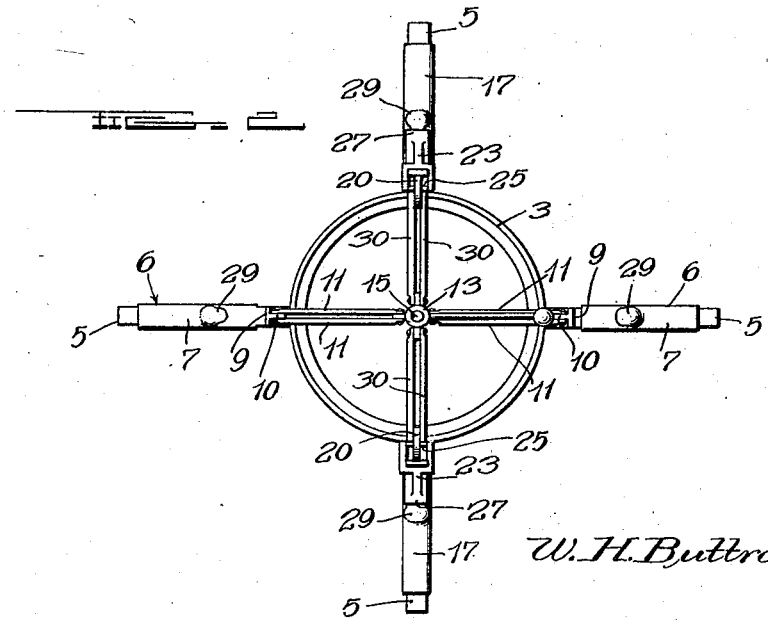
Inventor
W. H. Buttram
By Townshend & Townshend
Attorney

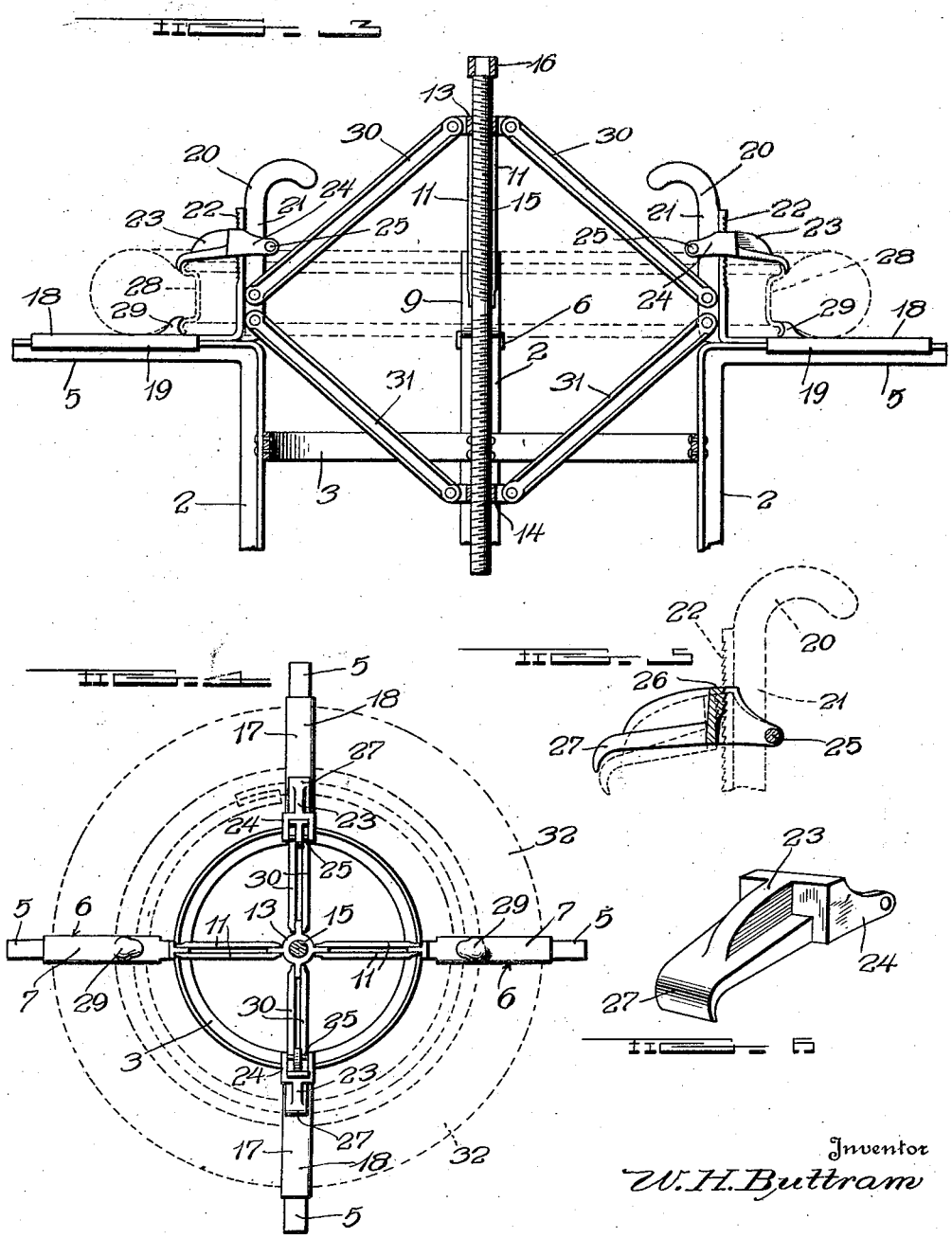

Patented May 27, 1924.

1,495,159

UNITED STATES PATENT OFFICE.

WILLIAM H. BUTTRAM, OF SALLISAW, OKLAHOMA, ASSIGNOR OF ONE-HALF TO R. KOBEL, ONE-FOURTH TO W. D. MAYO, AND ONE-FOURTH TO J. M. MAYO, ALL OF SALLISAW, OKLAHOMA.

TIRE TOOL.

Application filed April 6, 1922. Serial No. 549,966.

*To all whom it may concern:*

Be it known that I, WILLIAM H. BUTTRAM, a citizen of the United States, residing at Sallisaw, in the county of Sequoyah and State of Oklahoma, have invented certain new and useful Improvements in a Tire Tool, of which the following is a specification.

My invention relates to tire tools and has particular reference to an apparatus comprising mechanism for expanding and contracting tire rims.

The primary object is the provision of a combined rim contractor and expander and supporting stand, arranged for efficient operation in tire setting work.

Another object is the provision of a device of this character equipped with novel rim contracting and expanding means.

With these and such other objects in view as will be apparent from the description, my invention resides in the novel combination, construction, and arrangement of parts hereinafter described and claimed, and illustrated in the accompanying drawings, of which;

Figure 1 is a side elevation of the device,

Figure 2 a top plan view thereof,

Figure 3 a vertical section on line 3—3 of Fig. 1,

Figure 4 a top plan view showing a tire and rim in position.

Figure 5 a detail section through one of the rim clamping members employed, and

Figure 6 a perspective of the member illustrated in Figure 5.

In detail the invention comprises a standard 1 formed of vertical leg members 2 of T shaped cross section connected by bracing rings 3 and 4. The lower ends of the leg members are flared outwardly to form a base, and the upper portions of the legs are extended outwardly and laterally for an appreciable distance in a horizontal plane, forming the arms 5. The leg members and arms are constructed of metal T strips, with the brace rings 3 and 4 connected to the inner faces of the heads and with the webs disposed outwardly of the standard.

Slidably mounted on one diametrically opposed pair of the arms 5 are the rim expander brackets 6 formed of cast or stamped metal and having bases 7 slidably engaged over the arms by means of lateral flanges 8 bent under the edges of the arms. The inner ends of the brackets 6 are formed with integral upstanding portions 9, T shaped in cross section, the webs 10 thereof being pivotally connected to a pair of double arms 11 and 12, these arms 11 being connected at their opposite ends in pivotal relation with a block 13, and the arms 12 being similarly connected to a block 14.

Blocks 13 and 14 are centrally apertured and internally threaded to receive therethrough a threaded stem 15, oppositely threaded from its central portion, and squared at its upper end to receive thereover an operating handle 16.

On the other pair of the arms 5 are similarly arranged the rim holding brackets 17 comprising bases 18, side flanges 19, upturned T shaped ends 20 with the webs 21, all of which are similar in construction and function to the brackets 6 heretofore described, with the exception that the upper ends of the portions 20 are inwardly curved, as shown in Figure 3, and their outer faces are serrated as at 22. Vertically slidable over the upturned ends 20 are shoes 23 provided with arms 24 connected behind the webs 21 by means of cross bars 25, and the faces of the shoes contiguous to the serrated portions 22 of the bracket ends 20 are serrated as at 26, sufficient play being allowed therebetween so that on a slight rocking movement of the shoes on the cross bars 25 as pivots, the serrated faces may be engaged or disengaged to lock the shoes or permit same to be moved as desired. Rim engaging hooks 27 extend from the shoes 23 to engage over the edge of a tire rim 28, when applied. Each of the brackets 6 and 17 are provided with rim engaging lugs 29 spaced laterally from the upturned ends a sufficient distance to allow of a rim being inserted therebetween, as illustrated in Figures 1 and 3.

To the webs 21 of the bracket ends 20, are pivotally connected two pair of double arms 30 and 31, which are in turn pivoted at their opposite ends to the blocks 13 and 14 respectively. It will thus be seen that when the operating handle 16 is rotated the blocks 13 and 14 will either be drawn toward each other or moved apart, as the case may be, to draw the rim holding brackets 6 and 17 inwardly of the standard, or move same outwardly thereof.

With a tire rim 28 carrying a tire 32, positioned over the brackets as described, and the hooks 27 engaged, the handle 16 may be actuated to contract the rim for ready removal of the tire. On a reversal of rotation, the brackets 6 will force the rim outwardly, expanding it to its original position.

It will thus be seen that I have provided a very simple and efficient mechanism for accomplishing the objects specified, and while I have illustrated and described certain details and materials entering into the construction and operation of the device, I desire it to be understood that I do not intend to limit myself to these, but that any such may be used as will fall within the scope of the invention as claimed.

I claim:—

1. In a tire tool, a standard comprising metal leg members T-shaped in cross section, means for connecting said members in spaced relation, said members having their upper ends extending outwardly laterally in a common plane to form radiating arms, plates slidably mounted over said arms flanges on the side edges of said plates bent inwardly to engage the sides of the arms for securing the plates thereto, the inner ends of said plates carrying rim engaging brackets formed integrally therewith, and means for expanding and contracting said brackets connected to and supported thereby.

2. In a tire tool, a standard, rim supporting arms extending laterally therefrom, rim engaging brackets mounted for longitudinal movement on said arms, means for connecting, expanding and contracting said brackets, supported entirely thereby over and within said standard.

In testimony whereof I affix my signature.

WILLIAM H. BUTTRAM.